April 26, 1949. E. L. SINCLAIR ET AL 2,468,468
APPARATUS FOR CONDUCTING REACTIONS
IN THE PRESENCE OF A CONTACT MASS
Filed May 27, 1943 2 Sheets-Sheet 1
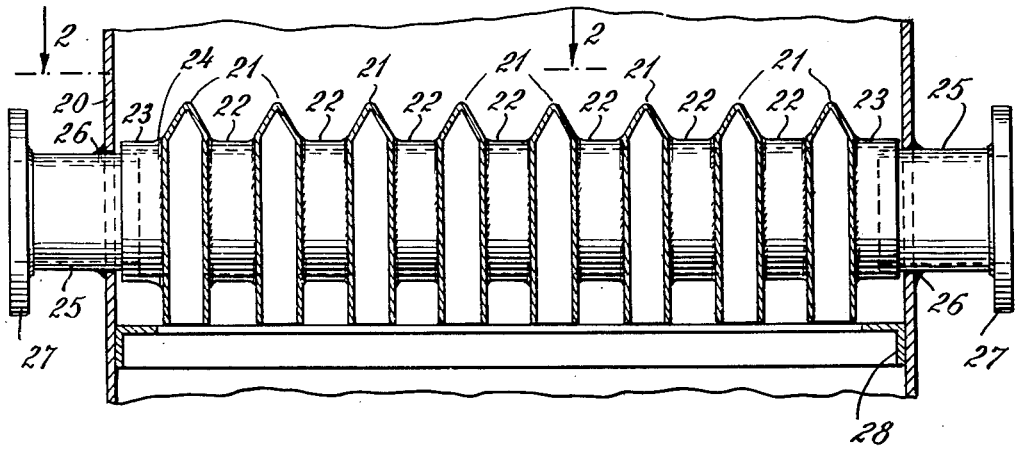
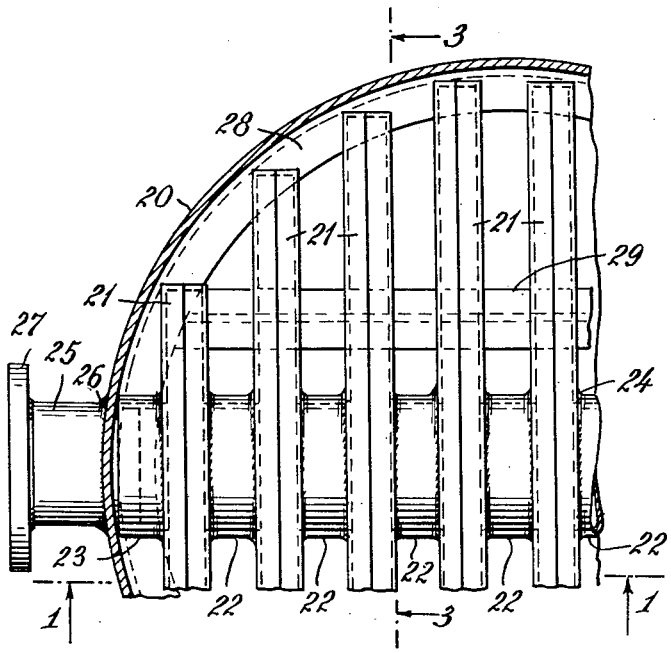
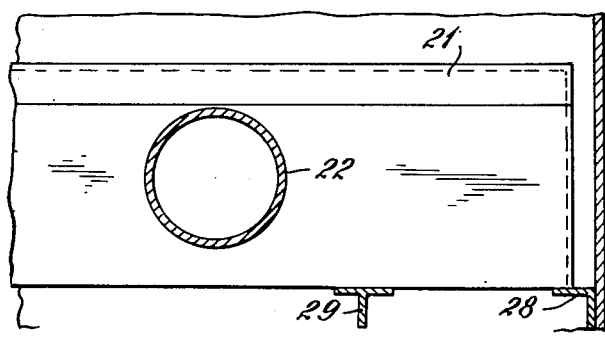
INVENTORS
EDWARD L. SINCLAIR
ERNEST UTTERBACK
BY
ATTORNEY.

April 26, 1949.  E. L. SINCLAIR ET AL  2,468,468
APPARATUS FOR CONDUCTING REACTIONS
IN THE PRESENCE OF A CONTACT MASS
Filed May 27, 1943  2 Sheets-Sheet 2
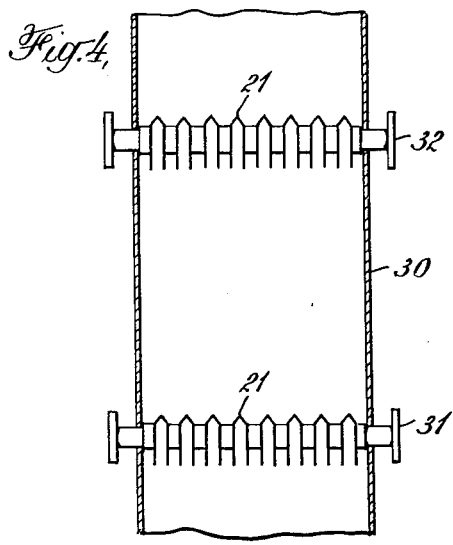
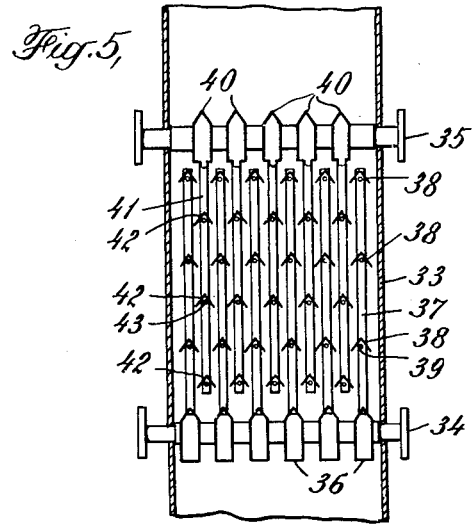
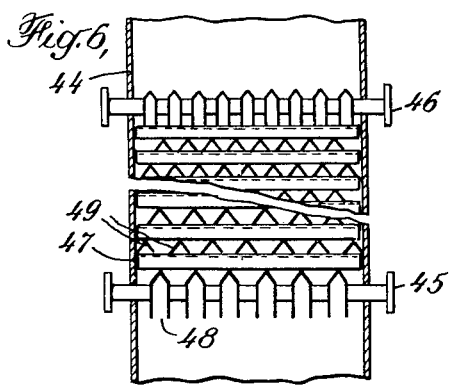
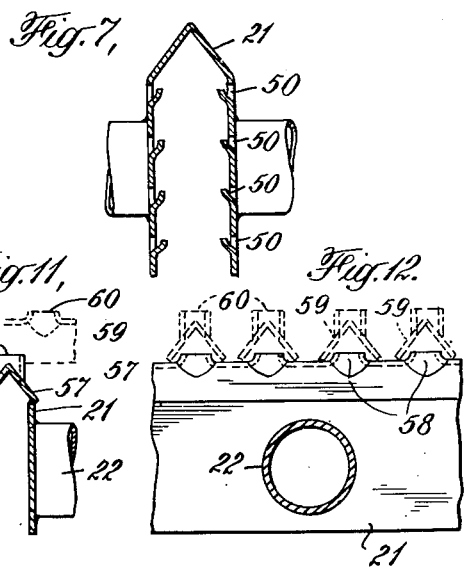
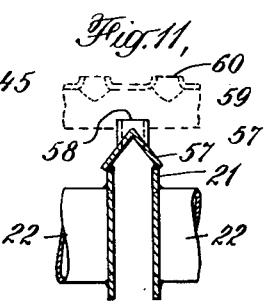
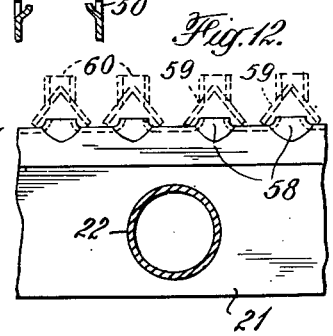
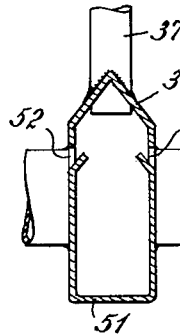
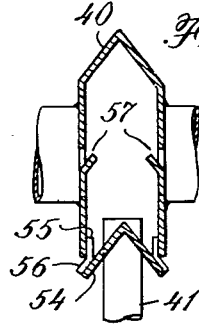
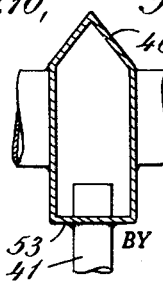
INVENTORS
EDWARD L. SINCLAIR
ERNEST UTTERBACK
BY
ATTORNEY.

Patented Apr. 26, 1949

2,468,468

UNITED STATES PATENT OFFICE 2,468,468

APPARATUS FOR CONDUCTING REACTIONS IN THE PRESENCE OF A CONTACT MASS

Edward L. Sinclair, Philadelphia, and Ernest Utterback, Upper Darby, Pa., assignors to Socony-Vacuum Oil Company, Incorporated, a corporation of New York Application May 27, 1943, Serial No. 488,782

7 Claims. (Cl. 23—288)

This invention has to do with apparatus for conducting reactions of fluid reactants such as hydrocarbon vapors in the presence of a moving bed of particle form solid contact mass material which may be catalytic to the desired reaction. Exemplary of the processes of this kind is the cracking conversion of hydrocarbons, it being well known that hydrocarbons of gas oil nature boiling between about 500° F. and about 750° F. may be substantially cracked to gasoline by passing them at reaction conditions of temperature and pressure such as, for example, temperatures of the order of 875° F. at pressures somewhat above atmospheric, in contact with a solid adsorptive catalytic contact mass. Usually, such contact masses partake of the nature of fuller's earth, or other natural or treated filtering clays and/or various synthetic associations of alumina, silica, or alumina and silica, any of which may or may not have other constituents added for a purpose in connection with the processes, such as certain metallic oxides. In a most recent form, this operation has been developed as one in which the particle form solid contact mass material is moved cyclically through two zones in the first of which it is subjected to reaction and in the second of which it is subjected to the action of a fluid regenerating medium, such as a combustion-supporting gas, acting to burn off contaminant materials deposited upon the contact mass during reaction.

This invention has specifically to do with details of construction in connection with reactors and regenerators wherein fluid reactants are brought into contact with a moving stream of particle form solid contact mass material. Inasmuch as both reactor and regenerator are alike in this fundamental operation, the term reactor will be used hereinafter in the explanation of the invention and in claiming the invention in a sense sufficiently broad to include fluid-solid contact apparatus regardless of exact purposes of use.

A major object of this invention is the provision of a distributing and collecting means whereby fluid reactants may be conducted into such a reactor or collected and conducted from such a reactor in such manner as to secure adequate and even distribution across the entire cross section of the reactor. It has specifically to do with a detail of construction which may be used either as an inlet distributor for fluid reactant or as an outlet collector for fluid reactant.

In order to readily understand this invention, reference is made to the drawings attached hereto in which Figure 1 shows a view—partially in section—of such a grid. Figure 2 shows a partial plan of such a grid, and Figure 3 shows a partial elevation of such a grid. Figures 4, 5 and 6 show three types of reactors and how the grid may be used in each. Figures 7, 8, 9, 10, 11 and 12 show modifications of portions of the grid to fit it for each of the uses to which it may be put. All of these drawings are diagrammatic in character.

Turning to Figure 1, we find that 20 is the shell of a reactor which is used to confine a downwardly flowing stream or moving bed of particle form solid contact mass material. The reactor chosen for this explanation happens to be circular in form, but the principles of construction detailed herein apply equally well to reactors having other forms of cross section. Extending from wall to wall within the reactor, we find a grid work composed alternately of certain inverted, narrow, gable-roofed, trough-like members 21, between each of which there is a tubular spacer 22 and upon the outboard side of the trough member of 21 at either end, there is an external tubular member 23. The trough members 21 extend from wall to wall of the reactor in a direction perpendicular to the plane of the drawing Figure 1. The spacer members 22, troughs 21 and end members 23 are so assembled with proper orifices in the side walls of each trough 21 at the proper point so that the spacers 22 and end member 23 in effect constitute a single tubular passage extending from wall to wall of the reactor with which the interior of each trough member 21 is in full communication. Thus, any fluid introduced at either end of this central tubular member flows into the trough-like members and then is in a position to flow out uniformly over all portions of the cross section of the reactor through appropriate arrangements later detailed. Similarly, if the trough members 21 be open at the bottom, as shown in this figure, fluid reactants from any portion of the reactor are capable of flowing uniformly first into a trough and then may be removed at either end. The trough members 21 and spacers and end members 22 and 23 are most conveniently assembled by welding as at 24. When placed within the reactor, the grid assembly may be conveniently placed in communication with the areas outside of the reactor by the construction shown in this figure. The end members 23 are placed in register with an opening extending through the wall 20 of the reactor and a short spool or sleeve or pipe of the proper diameter to slip through that hole and a short distance into the end member 23 is provided, as, for example, at 25. This sleeve may then be welded to the reactor shell as at 26 and may be provided upon its outer end with a flange 27 for connection to whatever duct system is provided for the fluid medium being handled. It is also convenient within the reactor to provide an angle iron shelf 28 to serve as a support and as a means for keeping the trough members 21 properly placed within the reactor.

Turning now to Figure 2, we have a plan view of a portion of the grid assembly showing the reactor shell 20, the support angle iron 28, several troughs 21, several spacers 22, one end member 23, and the external spool 25 with its flange 27.

Figure 3 is a side view partially in section showing the reactor shell 20, the support angle iron 28, a spacer 22 and a side view of a single trough 21 and also showing how additional support may be provided for the trough members by a support beam 29 extending transversely across the reactor shell at a proper level as shown in both Figure 3 and in Figure 2.

It will be understood that in reactors of large cross section, several members, such as that provided by the combination of spacers 22 and end members 23, may be used without departing from the spirit of the invention.

This basic grid structure may be used in several ways. For example, in Figure 4, two essentially similar members may be used, spaced vertically in a reactor, one being used as a fluid distributing member and the other as a fluid collecting member. For example, in Figure 4, we have a reactor defined by walls 30 which reactor is substantially filled with a downwardly flowing stream or bed of particle form contact mass material. In it we have, vertically spaced, two grids 31 and 32, should it be desired to flow reactants in countercurrent to the contact mass, 31 would act as a distributor grid and 32 as a collector grid, both being put into communication with proper outside piping for handling fluid reactants and products of reaction. Similarly, if it were desired to flow the fluid reactant concurrently with the solid contact mass material, 32 would be the inlet grid or distributor and 31 the collector grid. The same grid work may serve as a basic structure for another type of reactor wherein a different mechanism for distribution of fluid reactant into the bed of the contact mass material is utilized. In this case, in Figure 5, assuming that 33 is the shell of the reactor, 34 the reactant inlet, and 35 the reactant outlet, we may adopt the following construction: upwardly from each trough member 36 upon the bottom grid there extends a series of pipes 37 closed at their upper ends. These pipes will be distributed at intervals along the length of trough 36, only one being shown in the plane of the drawing of Figure 5. Then spaced at intervals along the height of pipe 37, there will be located troughs 38, each trough extending transversely substantially from wall to wall of the reactor in a direction perpendicular to the plane of the drawing and parallel to the trough 36, and embracing several of the pipes 37. Under each trough 38, there will be an orifice 39. The bottom of each trough 36 will be closed or substantially closed. Fluid reactant flowing into grid 34 will proceed from each trough 36 upwardly through each pipe 37 out through each orifice 39 along under each trough 38 and thence out into the body of contact mass in the reactor. Depending downwardly from each trough 40 on grid 35, there will be a similar series of pipes 41, each similarly equipped with transverse troughs 42 and in each pipe 41 under each trough 42, there will be an orifice 43. Fluid reactants flowing from the contact mass bed into the space under troughs 42 will pass through orifices 43 into pipes 41 thence into trough 42 and thence out of the reactor. Similarly, the same grids may be utilized in another type of reactor as shown in Figure 6, wherein in a reactor defined by walls 44, grid 45 may be the inlet member and grid 46 the outlet member. Above grid 45 and extending upwardly to the grid 46, there is a reactor packing composed of alternate layers of angle irons, the first layer 47 being placed transversely to distributor troughs 48, the second layer 49 being placed transversely to the first layer and so on. As shown in a later detail, these angle irons are pierced at intervals along their apex and the layer of angle irons next above is so placed that the fluid reactants pursue a tortuous course through the various layers of angle irons while the contact mass material surrounds the angle irons, filling the reactor except for certain spaces under each angle iron and contact between reactant and solid may be effected in this manner.

In utilizing the grid structure in the various manners indicated in Figures 4 to 6 inclusive, certain modifications of trough structure are conveniently made. For example, in Figure 7, there is shown in diagram form a cross section of a trough member 21 appropriate for use either as a distributor or collector trough, and particularly for use in a reactor such as that shown in Figure 4. This trough, as may be seen from Figure 7, has the side walls of the trough member 21 pierced with a series of slots 50 so arranged that fluid reactants may pass through the slots while solid contact mass material will not. Such a trough may be used either as a distributor trough or as a collector trough.

In Figure 8, there is shown a detail, particularly useful for distributor troughs in the inlet grid of a reactor such as that shown in Figure 5. In this modification, the trough 36 is closed at the bottom as shown at 51 and at the top there is welded in the upwardly extending distributor pipe 37. In this form of construction, there may also be provided slots such as that shown at 52, if desired. Still showing trough details applicable to the reactor described in Figure 5, we turn to Figure 9 where it is shown how the collector troughs 40 of the upper grid structure 35 may be handled in a very simple manner by closing the bottom as at 53 and mounting therein the collector pipe 41. In this case, it is usually preferable to utilize a structure more like that shown at Figure 10 wherein 40 again represents the collector trough of the upper manifold but instead of being closed at the bottom, as in Figure 9, an angle iron 54 properly supported by spacers 55 is utilized both to support collector pipe 41 and to provide an access slot 56, thus giving an additional opening whereby reactant may escape from the portions of the bed nearest the collector grid shown as 35 in Figure 5. Also in Figure 10, it is sometimes found preferable to include in the side walls of the trough 40, one or more slots 57.

In Figures 11 and 12, which should be read together, we have a showing of both the form of distributor grid construction appropriate for the type of reactor shown in Figure 6 and a small amount of detail illustrative of the type of reactor packing therein used in Figures 11 and 12.

In Figures 11 and 12, we have spacers 22 and a trough 21 which trough happens in this case to be open at the bottom and which trough is capped at the top by an angle member 57 which has been punched at intervals along its length to provide upwardly extending chimneys 58. Fluid reactant introduced under trough 21 can pass upwardly through each of these chimneys. Above each of these chimneys, as shown by dotted lines, there is placed an angle iron 59 which angle iron is one of the members of the lowermost layer 47 shown in Figure 6. Each angle iron 59 is similarly provided with spaced upwardly extending chimneys 60 and is so positioned that a chimney 60 is displaced laterally from the chimney 58. Subsequent layers of similarly pierced angle irons mounted for similar lateral displacement of chimneys constitute packing of the reactor shown in Figure 6 extending upwardly to the collector grid assembly above the reaction space.

We claim:

1. In a reactor of the kind described, a grid unit comprising a series of gable-roofed trough members having substantially vertically extending side walls pierced by openings at substantially the same distance below the gable peaks and horizontally at substantially half of the distance from the ends thereof, said troughs being united together by sections of pipe at the openings so that distributed flow is permitted through the pipe and downwardly from the open bottoms of the troughs, pipe sections extending from the openings in the outer walls of the end troughs of the series, pipe sections of smaller diameter than the last named pipe sections extending through the walls of the reactor and projecting into said last named pipe sections thereby forming supports for said grid unit, and means forming a gas-tight seal between the walls of the reactor and each pipe section of smaller diameter.

2. In a reactor of the kind described, a grid unit comprising a series of inverted gable-roofed trough members having substantially vertically extending side walls pierced by openings at substantially the same distance below the gable peaks and horizontally at substantially the same distance from the ends thereof, said troughs being united together by sections of pipe at the openings so that distributed flow is permitted through the pipe and downwardly from the open bottoms of the troughs, pipe sections extending from the openings in the outer walls of the end troughs of the series, pipe sections of smaller diameter than the last named pipe sections extending through the walls of the reactor and projecting into said last named pipe sections thereby forming supports for said grid unit, and means forming a gas-tight seal between the walls of the reactor and each of said pipe sections of smaller diameter.

3. In a reactor of the kind described, a grid unit comprising a series of inverted gable-roofed trough members having substantially vertically extending side-walls pierced by openings at substantially the same distance below the gable peaks and horizontally at substantially the same distance from the ends thereof, said troughs being united together by tubular members at the openings so that distributed flow is permitted through the pipe and downwardly from the open bottom of the troughs, tubular members extending from the openings in the outer walls of the end troughs of the series, tubular members of smaller diameter than the last named tubular members extending through the walls of the reactor and projecting into said last named tubular members thereby forming supports for said grid unit, and means forming a gas-tight seal between the walls of the reactor and each of said tubular members of smaller diameter.

4. In a grid unit as described and set forth in claim 3 the side walls of said troughs being pierced with openings constructed and arranged when said troughs are in the inverted position to provide passage for fluid reactants while preventing the passage of solid contact mass material.

5. In a reactor of the kind described, a grid unit comprising a series of gable-roofed closed trough members having substantially vertically extending side walls and bottoms substantially normal to said side walls, said side walls being pierced by openings at substantially the same distance below the gable peak and horizontally at substantially the same distance from the ends thereof, tubular members in fluid communication with said trough members extending upwardly at spaced intervals along the lengths of the gable peaks of said trough members, said tubular members being closed at the upper ends thereof and provided at spaced intervals along the vertical length thereof with open inverted trough members extending transversely substantially from wall to wall in the reactor in a direction normal to the vertical axes of said upwardly extending tubular members, said upwardly extending tubular members being provided with at least one opening under each of said open inverted trough members, said gable-roofed closed trough members being united together by horizontal tubular members at the openings in the side walls so that distributed flow is permitted through the tubular members and upwardly through said closed trough members, said upwardly extending tubular members and said open inverted trough members, horizontal tubular members extending from the openings in the outer walls of the end closed trough members of the series, horizontal tubular members of smaller diameter than the last named horizontal tubular members extending through the walls of the reactor and projecting into said last named horizontal tubular members thereby forming supports for said grid unit, and means forming a gas-tight seal between the walls of the reactor and each of said horizontal tubular members of smaller diameter.

6. In a reactor of the kind described, a grid unit comprising a series of gable-roofed closed trough members having substantially vertically extending side walls and bottoms substantially normal to said side walls, downwardly hanging tubular members at spaced intervals along the length of the bottoms of said closed trough members and in fluid communication therewith, said pendant tubular members being closed at the lower ends thereof and provided at spaced intervals along the vertical length thereof with inverted open trough members extending transversely substantially from wall to wall in the reactor in a direction normal to the vertical axes of said pendant tubular members, said pendant tubular members being provided with at least one opening under each inverted open trough members, the side walls of said closed trough members being pierced by openings at substantially the same distance below the gable peaks and horizontally at substantially the same distance from the ends thereof said closed trough members being united together by horizontal tubular members at the openings in the side walls so that distributed flow is permitted through the horizontal tubular members, the closed trough members, the pendant tubular members and the inverted open trough members, horizontal tubular members extending from the openings in the outer walls of the end closed troughs of the series, horizontal tubular members of smaller diameter than the last named horizontal tubular members extending through the walls of the reactor and projecting into said last named horizontal tubular members thereby forming supports for said grid unit and means forming a gas-tight seal between the walls of the reactor and each of said horizontal tubular members of smaller diameter.

7. In a reactor of the kind described, a grid unit comprising a series of inverted gable-roofed trough members having substantially vertically extending side walls and angle-iron bottoms, means securing said angle-iron bottoms in spaced relation with said side walls, tubular members attached at spaced intervals to and pendant from said angle-iron bottoms and in fluid communication with said gable-roofed trough members, said pendant tubular members being closed at the lower ends thereof and provided at spaced intervals along the vertical axes thereof with inverted open trough members extending transversely substantially from wall to wall in the reactor in a direction normal to the vertical axes of said pendant tubular members, said pendant tubular members being provided with at least one opening under each inverted open trough member, the side walls of said inverted substantially closed gable-roof trough members being pierced at substantially the same distance below the gable peaks and horizontally at substantially the same distance from the ends thereof, said inverted substantially closed gable-roofed trough members being united together by horizontal tubular members at the openings in the side walls so that distributed flow is permitted through the horizontal tubular members, the substantially closed trough members, the pendant tubular members and the open trough members, horizontal tubular members extending from the openings in the outer walls of the end substantially closed trough members of the series, horizontal tubular members of smaller diameter than the last named horizontal tubular members extending through the walls of the reactor and projecting into said last named horizontal tubular members thereby forming supports for said grid unit, and means forming a gas-tight seal between the walls of the reactor and each of said horizontal tubular members of smaller diameter.

EDWARD L. SINCLAIR.
ERNEST UTTERBACK.

REFERENCES CITED

The following references are of record in the file of this patent:

UNITED STATES PATENTS

| Number | Name | Date |
|---|---|---|
| 691,209 | Tweedale et al. | Jan. 14, 1902 |
| 1,256,681 | French | Feb. 19, 1918 |
| 1,784,536 | Pantenburg | Dec. 9, 1930 |
| 1,852,227 | Barstow et al. | Apr. 5, 1932 |
| 2,292,716 | Pyzel | Aug. 11, 1942 |
| 2,385,189 | Bowles | Sept. 18, 1945 |